Dec. 22, 1931.　　W. F. FRASER　　1,837,319
INTERMITTENTLY OPERATING MECHANISM
Filed Feb. 12, 1927　　2 Sheets-Sheet 1

Witnesses
Chas H. Richards
Evelyn M. Bancroft

Inventor
Warren F. Fraser
By Clayton L. Jenks
Attorney

Dec. 22, 1931.   W. F. FRASER   1,837,319
INTERMITTENTLY OPERATING MECHANISM
Filed Feb. 12, 1927   2 Sheets-Sheet 2

Witnesses
Chas H. Richards
Evelyn M. Bancroft

Inventor
Warren F. Fraser
By Clayton R. Jenks
Attorney

Patented Dec. 22, 1931

1,837,319

UNITED STATES PATENT OFFICE

WARREN F. FRASER, OF WESTBORO, MASSACHUSETTS

INTERMITTENTLY OPERATING MECHANISM

Application filed February 12, 1927. Serial No. 167,841.

My invention relates to grinding machines and particularly to such machines which have intermittently operated mechanisms for presenting pieces of work successively to the grinding wheel.

Of the various types of machines which have parts required to be moved intermittently, the automatic grinding machine may be cited as an example. In such a machine, it has been proposed to present the work to the grinding wheel by means of a rotatable turret mechanism. It is required that the turret be held stationary during the grinding operation and that it move as quickly as possible after the grinding has been finished to bring another piece of work to the grinding position in order to keep the nongrinding time as small as possible, thereby obtaining the maximum production from the machine. In accordance with my discoveries it is feasible to rotate such a turret by means of a mechanism comprising a Geneva movement. I have found, however, that it is desirable to start the Geneva plate gradually into motion in order to cause the turret to move smoothly. That being the case, the center of rotation of the driver which moves the Geneva plate should be so located that the slot in the Geneva plate will be substantially tangential to the direction of movement of the driving pin when it enters the slot. Practical considerations have determined the desirability for six steps, or more, in the Geneva movement, and with the driver properly located to give a smooth starting and stopping action to the Geneva plate, it is found that the driver must move through approximately 120° of its total revolution in moving the six step plate through a single step. Hence, only the remaining two-thirds of the distance of travel of the driving member is available for performing the other functions required of the machine. This means that, in a grinding machine, one-third of the time will be used in indexing the turret to position a new piece of work in front of the grinding wheel. Such an intermittently moving mechanism takes too large a part of the total time for feeding or indexing and is therefore too slow for high production machines.

It is accordingly the main purpose of my invention to provide an intermittently moving mechanism which will operate rapidly and smoothly and will start and stop the controlled mechanism gradually.

A further object of the invention is to provide a machine, having a rotatable part required to be indexed intermittently, with a driving mechanism so constructed and arranged that the indexing member may be moved very rapidly and yet with a gradual and easy motion and in which the lost time between the operations of the machine, while the indexing is going on, is reduced to a minimum.

With these and other objects in view as will be apparent to one skilled in the art, my invention resides in the combination of parts set forth in the specification and covered by the claims appended hereto.

In accordance with my invention, I propose to utilize a Geneva movement to produce an intermittent motion of a given part, and in order that the driven member, such as the work supporting turret of a grinding machine, may be rotated rapidly and yet smoothly, I propose to combine two Geneva movements in such a manner that the driving plate of the first movement will serve to rotate the driver which operates the second movement. The parts are also so arranged that the initial and final periods of movement of the driver of the first Geneva plate, as it enters and leaves the slots thereof, do not cause any motion of the second Geneva plate, hence only the intermediate period of movement of the first Geneva plate, which is comparatively uniform in rate, is utilized to intermittently rotate the second Geneva plate. By means of gearing, I so arrange the parts that the second driver will make one complete rotation during each indexing movement of the first Geneva plate. Since the first Geneva plate is given its movement while the first driver moves through a short arc of a circle, the second driver will also move only at this same time but through an entire circle, and the second Geneva plate is given its movement while the second driver moves through a short arc of a circle. Thereby, the time consumed in rotating a mechanism driven by the second plate, is minimized.

Referring to the drawings, which illustrate one embodiment of this invention, I have there shown a grinding machine work supporting turret moved intermittently by a double Geneva drive of the type above described.

In the drawings, in which like reference numerals indicate like parts:

Figure 1:
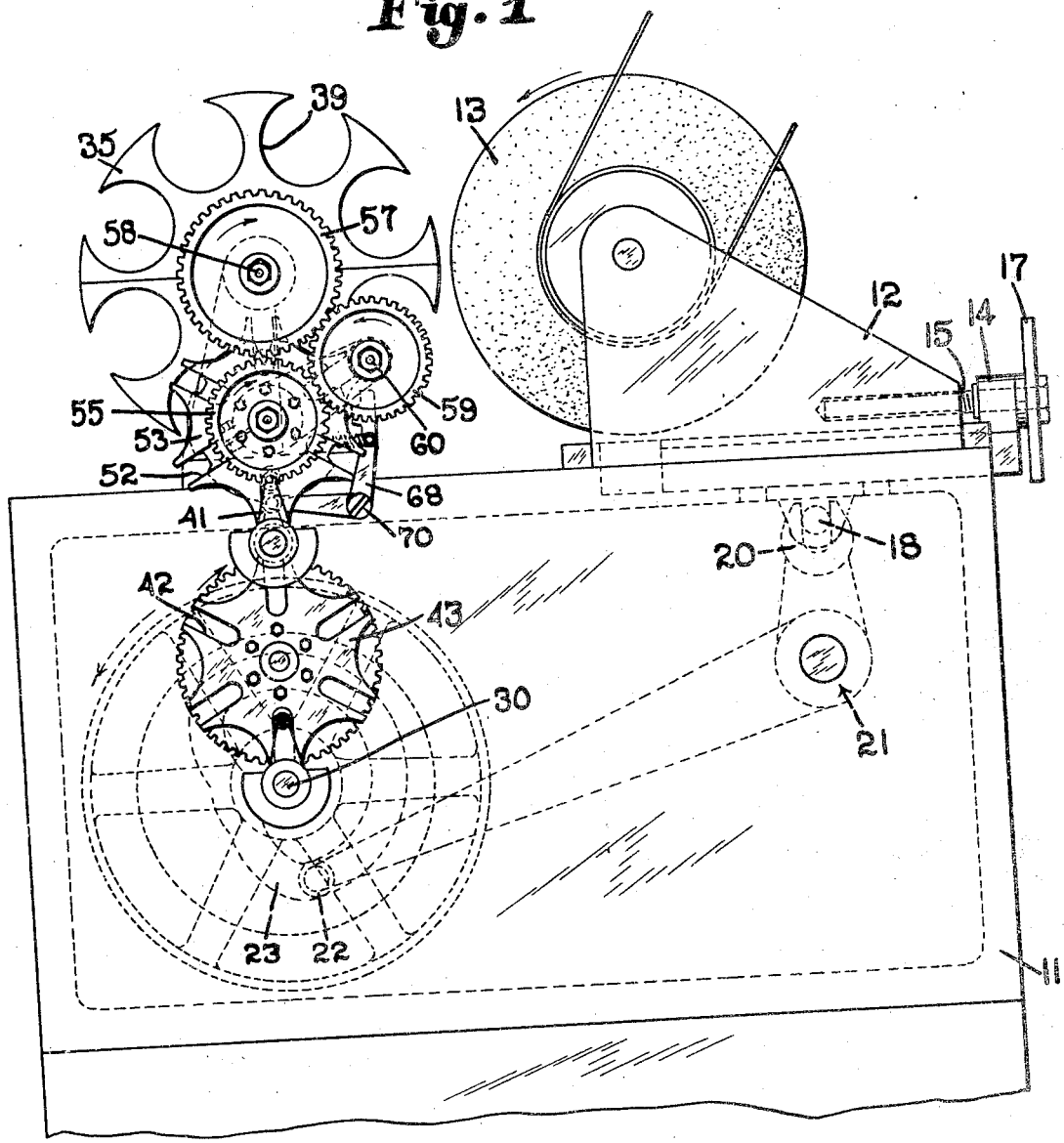
Figure 1 is an end elevation of a grinding machine, with various parts removed, which illustrates somewhat diagrammatically the arrangement of turret and grinding wheel, the turret and Geneva movements being shown in the middle of an indexing movement.

The grinding machine illustrated comprises a base 11 supporting a wheel slide 12 carrying the grinding wheel 13 in suitable bearings thereon. The wheel slide is adapted to slide on the usual ways on the machine base which is provided with a secondary slide 14 which is connected to the slide 12 by means of an adjusting screw 15 having on its outer end a hand wheel 17 to permit adjustment of the slide 12 relative to the slide 14. The under side of the slide 14 is provided with a projection having a portion 18 engaged by the yoked member 20 of the bell crank 21. The other arm of the bell crank 21 carries a cam follower 22 riding in the cam slot 23. The cam 23 is mounted for rotation on the main drive shaft 30 and is so shaped and positioned as to give the grinding wheel the desired feeding movement toward and from the work.

On the front portion of the base of the machine is a work supporting turret 35 mounted in suitable bearings 36 and 37 fixed to the base of the machine. The turret may be of any of the well known constructions but I preferably make it in two parts which separate on a diametrical line and are bolted together and clamped to shaft 58 by cap screws 38 after being placed in position on the machine. This feature enables the operator to readily change the turret without dismantling the remainder of the mechanism. The work pieces are placed in the openings 39 and there supported until each is presented to the centering members which grip the work and lift it clear of the turret support (without removing it from the opening 39) and rotate it during the grinding operation. When the work is finished it is released into the opening 39 and then revolved to a position outside of the grinding zone where it is removed from the turret.

To rotate the turret in timed relation with the feed of the grinding wheel, I preferably utilize the driving power of the main drive shaft 30 to drive the roller 40 of a Geneva movement. This mechanism may be of standard construction and it is shown as having six driving stages. The roller 40 is supported on an arm 41 mounted on the outer end of the shaft 30. The roller is positioned and arranged to engage the slots 42 in the first Geneva plate 43, to intermittently turn the shaft 44. To lock the Geneva plate 43 against rotation, except during the indexing period, I provide a partial convex cylindrical surface 50 integral with the arm 41 and opposed to the roller 40. The surface 50 is adapted to mate with the concave surfaces 51 on the Geneva plate 43 to prevent rotation thereof. Carried on the shaft 44 is the spur gear 45 meshing with a pinion 46 on the shaft 47. This gear and pinion are so proportioned that the pinion 46 will make one complete revolution during each movement of the Geneva plate 43. The shaft 47 carries an arm 48 supporting the roller 49 which is intended to drive a second Geneva plate. The driving roller is also so positioned and arranged that it will engage one of the six slots 52 in the Geneva plate 53 which is mounted on the shaft 54. Similarly, to lock the Geneva plate 53 against rotation except during the indexing period, I provide a partial convex cylindrical surface 61 integral with the arm 48 and opposed to the roller 49. The surface 61 is adapted to mate with the concave surfaces 62 on the Geneva plate 53 to prevent rotation thereof. It will be noted that while the second driver makes the same number of revolutions as the first driver, it makes a complete revolution while the first Geneva plate is being moved by the first driver and remains stationary during the rest of the time the first driver is making a complete revolution. Likewise, the second Geneva plate makes one indexing movement for each revolution of the second driver but it makes this movement while said driver is moving through a small part of its revolution and is at rest during the time the second driver is making the rest of its revolution, as well as the time said driver is at rest. Therefore, the second Geneva plate, while making the same number of movements as the first Geneva plate, makes each movement much quicker and remains at rest a correspondingly longer time. It will also be noted that the centers of revolution of the driver rollers 40 and 49 are so located that when they enter and leave the slots of their plates, the latter will extend substantially tangential to the directions of travel of the rollers. This insures a gradual and easy starting and stopping of each plate.

In order to transmit this intermittent motion to the turret, I preferably mount a gear 55 on the outer end of the shaft 54 and a second gear 57 on the outer end of the shaft 58 which carries the turret wheel 35. As shown in Fig. 1, an intermediate idler gear 59 is mounted on a stud 60 which is pivoted to swing about the shaft 54 as an axis and is provided with an adjustment so that it can move toward or from the axis of the shaft 54. This permits replacement of either or both of the gears 55 and 57 so that different ratios of gearing may be utilized to operate turrets having a varying number of work supporting openings.

In order that the openings in the turret mechanism may be brought into alignment with the work supporting spindles, I may provide any suitable exact index arrangement to positively insure the turret stopping at its proper position. In my preferred construction I provide an index plate 65 mounted on the shaft 54 which has notches 66 in its periphery adapted to be engaged by the pawl 67. The notches are so located that when pawl 67 engages one of them the turret has a work supporting station in correct relation to the grinding wheel. The pawl 67 is pivotally mounted on the arm of the bell crank 68 to swing about the pivot pin 70. It is essential that the indexing plate remain locked during the period in which the work is being operated upon, so that the turret may not become misplaced and interfere with the grinding action. To accomplish this I provide a mechanism for locking the plate in timed relation to the Geneva movement. In my preferred construction I provide a cam 74 on the shaft 47 which rotates therewith. The arm 75 of the bell crank carries a follower roller 76. The cam 74 has a projection 77 so arranged beneath the roller that during a major portion of the grinding action, the pawl 67 will be held in engagement with one of the notches, but during the index period the high point 77 of the cam raises the roller 76 and removes the pawl 67 from engagement with the notch 66 and permits the Geneva mechanism to turn the turret and thereby replace the work in the grinding zone.

Figure 2:
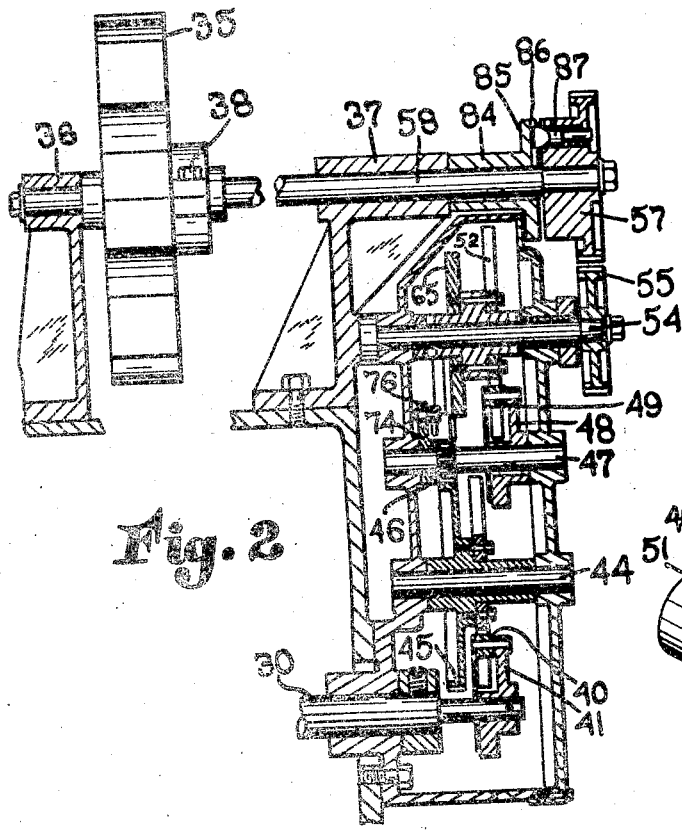
Fig. 2 is a fragmentary cross-sectional view of the turret operating mechanism.
Figure 3:
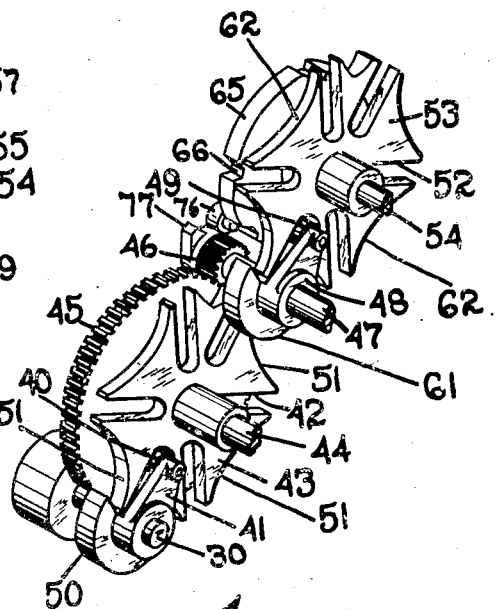
Fig. 3 is a fragmentary perspective view of the Geneva movement.
Figure 4:
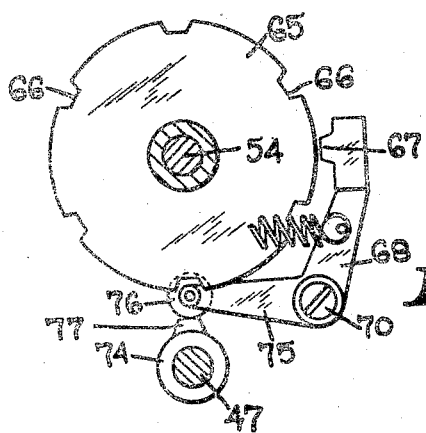
Fig. 4 is a fragmentary detailed view showing the index plate locking mechanism.

To prevent indexing the turret in case of accident as when the work becomes jammed in the machine, I may provide any suitable safety device to permit slippage in the driving mechanism. In my preferred construction I have shown a yieldable connection between the gear 57 and the shaft 58 (Fig. 2). The shaft 58 has a driving member 84 keyed thereto and this is provided with a face plate 85 having a V-shaped slot 86 extending radially thereof. The gear 57 is provided with a spring pressed plunger 87 having a correspondingly V-shaped end adapted to engage the radial slot 86. In case the work becomes jammed in the machine and tends to stop the member 84, the plunger 87 will slide up the surface of the V-slot 86 and turn relative to the driving member 84. This relative movement between the gear 57 and the shaft 58 will continue until the jammed work has been removed or the machine stopped and the plunger 87 returned into alignment with the slot 86 when the machine is ready for the next indexing movement.

Figure 5:
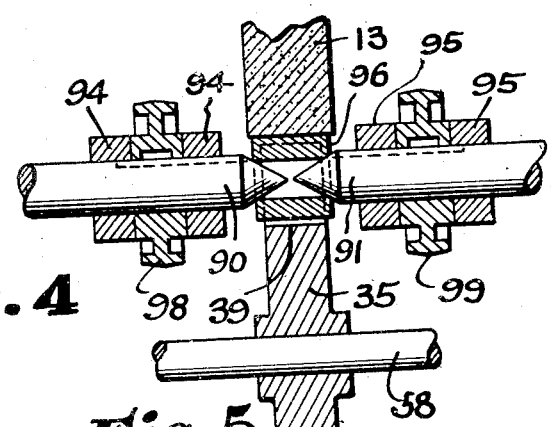
Fig. 5 is a horizontal sectional view partly broken away showing the work supporting and centering mechanism.

The work supporting mechanism may be of standard construction and as shown in Fig. 5 comprises two rotatably and slidably mounted centering members 90 and 91 which are mounted in bearings 94 and 95 respectively, secured to the base 11 of the machine. The centering members are axially slidable by suitable mechanism and are arranged to simultaneously approach the work piece, which in the present instance is illustrated as a bushing 96, lift it from the turret opening 39, and rotate it during the grinding cycle in correct grinding position. The work piece is illustrated as gripped between two conical heads upon the centering members, but it will be apparent that these heads may be shaped in any way to properly grip the work and rotate it. To rotate the work piece 96 during the grinding operation, I provide each of the centering members with pulleys 98 and 99 in slidable driving engagement therewith and simultaneously rotate said pulleys in the same direction at the same rate from any suitable source of power. Upon completion of the grinding operation, I withdraw the centering members from the work whereupon the work may again be received by the turret and carried out of the grinding zone.

The operation of the machine will be apparent from the above disclosure. In the mechanism illustrated, the grinding wheel is fed periodically towards and from the work supporting turret as determined by the operation of the cam members 22 and 23. During the period that the grinding operation is going on, the turret wheel remains stationary so as not to interfere with the work which is being ground. The continuously moving shaft 30 rotates with the cam which moves the wheel and ultimately, at the time when the grinding wheel is retreating, the roller 40 engages one of the slots in the first Geneva plate 43. This roller enters the slot tangentially and starts the plate into rotation very gradually and smoothly. As the plate begins to rotate, the gear 46 is turned and this in turn revolves the second driver 49, but the second driver will not enter one of the slots 52 in the plate 53 until the first driver 40 has reached the more central portion of its travel during which the first Geneva plate 43 is moving rapidly. Consequently, the second Geneva plate is moved and the turret wheel 35 in turn is rotated only while the driver roller 40 is travelling through a very small arc of its total path. As a result, the driving shaft 30 may rotate through the major portion of its cycle before the turret is turned and this gives the grinding wheel the maximum amount of time for its grinding operation and causes the turret to be revolved very quickly, but at the same time easily and smoothly. When the Geneva movement has stopped its intermittent motion, the pawl 67 will engage the slot 66 in the wheel 65, thus holding the turret from further rotation until the cam 74 releases the pawl 67, the movement of the cam 74 being in timed relation with the movement of the main driving shaft of the machine. If, by any chance, the work should become jammed and tend to prevent rotation of the turret, the releasable friction driving member formed by parts 85 and 87 will permit the Geneva movement to revolve without affecting the turret.

Having thus described my invention, what I claim as new and desire to secure by Letters Patent is:

1. A machine tool comprising a rotatable work supporting turret, a cutting tool opposed thereto, means to rotate said turret to bring successive pieces of work into operative relation with the cutting tool including a continuously rotated drive shaft, a Geneva movement operated thereby, a second Geneva movement operated by the first, connections between the second movement and the turret to rotate the same intermittently and an indexing mechanism actuated by said second Geneva movement to accurately position the turret relative to the cutting tool.

2. A machine tool comprising a rotatable work supporting turret, a cutting tool opposed thereto, means to rotate said turret having a continuously rotated drive shaft, a Geneva movement operated by said shaft, a second Geneva movement operated by the first, driving connections between said second movement and turret, including a train of gears, one of which is adjustably positioned so that either or both of the gears engaged thereby may be changed to vary the angular movement of said turret.

3. A grinding machine comprising a rotatable work supporting turret, a grinding wheel opposed thereto, a continuously rotated drive shaft, connections between the shaft and grinding wheel to feed the grinding wheel toward and from the work cyclically, a Geneva movement driven intermittently by said shaft, a second Geneva movement driven intermittently by the first movement, connections between said second movement and turret to operate the same and an indexing mechanism interposed between the second Geneva movement and the turret to accurately position the turret relative to the grinding wheel.

4. A grinding machine comprising a rotatable work supporting turret, a grinding wheel opposed thereto, means to move the wheel cyclically toward and from the work in the turret, a power driven shaft, a Geneva movement driven in timed relation with the wheel movement to rotate the turret when the wheel is out of contact with the work, and a yieldable driving connection between the shaft and the turret which permits the turret to remain stationary if any unusual resistance to its rotation is met, but which can rotate the turret only in a predetermined timed relation with the wheel movement.

5. A cylindrical grinding machine comprising a base, a grinding wheel rotatably mounted on a horizontal axis, a wheel slide supporting the wheel for movement transversely of the wheel axis, a work centering device and means to rotate the work thereby, a turret rotatable on an axis parallel to the wheel axis and arranged to successively present work pieces to the centering device for rotation in engagement with the grinding wheel, means for moving the grinding wheel toward and from the work to grind it to an accurate size, and mechanism comprising a series of Geneva movements, one actuated by another, which rotates the turret intermittently through a partial turn while the grinding wheel is out of contact with the work so as to successively locate each work piece accurately in grinding relation to the wheel.

6. A grinding machine comprising a rotatable work supporting turret, a grinding wheel opposed thereto, a power driven shaft, and driving connections between said shaft and turret to intermittently turn the latter, including a yieldable member rotated by the power driven shaft and a single driven member rotatable with the turret which can have only a single angular driving relationship, but which permit the turret to remain stationary if any unusual resistance to its rotation is encountered.

7. A grinding machine comprising a rotatable work supporting turret, a grinding wheel opposed thereto, means to move the wheel cyclically towards and from the work in the turret, a power driven shaft, a Geneva movement driven in timed relation with the wheel movement to rotate the turret when the wheel is disengaged from the work, and driving connections between the shaft and the turret, including a yieldable member rotated by the Geneva movement and a single driven member rotatable with the turret which can have only a single angular driving relationship, but which permit the turret to remain stationary if any unusual resistance to its rotation is encountered.

Signed at Worcester, Massachusetts, this 11th day of Feb., 1927.

WARREN F. FRASER.